US012608618B2

(12) United States Patent
Hoang et al.

(10) Patent No.: US 12,608,618 B2
(45) Date of Patent: Apr. 21, 2026

(54) AUTOMATIC AND UNSUPERVISED DETACHED SUBGRAPH DETECTION IN DEEP LEARNING PROGRAMS

(71) Applicant: International Business Machines Corporation, Armonk, NY (US)

(72) Inventors: Thanh Lam Hoang, Maynooth (IE); Gabriele Picco, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 17/096,494

(22) Filed: Nov. 12, 2020

(65) Prior Publication Data

US 2022/0147831 A1 May 12, 2022

(51) Int. Cl.
*G06N 3/084* (2023.01)
*G06F 18/20* (2023.01)
(Continued)

(52) U.S. Cl.
CPC .......... *G06N 3/088* (2013.01); *G06F 18/2155* (2023.01); *G06F 18/29* (2023.01); *G06N 3/084* (2013.01)

(58) Field of Classification Search
CPC ........ G06N 3/088; G06N 3/084; G06N 20/00; G06F 18/2155; G06F 18/29
See application file for complete search history.

(56) References Cited

U.S. PATENT DOCUMENTS 10,481,879 B2 11/2019 Stevens et al.
10,558,804 B2 2/2020 Davis et al.
(Continued)

FOREIGN PATENT DOCUMENTS

CN 108829438 B 11/2018
GB 2575496 A 1/2020

OTHER PUBLICATIONS

Ma, "MODE: Automated Neural Network Model Debugging via State Differential Analysis and Input Selection") ESEC/FSE '18, Nov. 4-9, 2018, Lake Buena Vista, FL, USA (Year: 2018).*
(Continued)

*Primary Examiner* — Usmaan Saeed
*Assistant Examiner* — Su-Ting Chuang
(74) *Attorney, Agent, or Firm* — Scully, Scott, Murphy & Presser, P.C.; Yuanmin Cai

(57) ABSTRACT

Detecting an anomaly in deep learning programming can include receiving a deep learning program with neural network. A pre-trained machine learning model can be run with the deep learning program with neural network as input. The pre-trained machine learning model detects whether the neural network includes a detaching subgraph. Responsive to detecting that the neural network includes a detaching subgraph, a location of the deep learning program causing the detaching subgraph can be output. The neural network of the deep learning program can be run in training mode and weight gradients associated with training of the neural network can be monitored. Based on the monitoring, occurrence of one or more detaching subgraphs can be detected. Responsive to detecting a detaching subgraph, the detaching subgraph can be output. A suggestion to correct the deep learning program can also be output.

15 Claims, 10 Drawing Sheets

RECEIVE A DEEP LEARNING PROGRAM WITH NEURAL NETWORK — 602

RUN A PRE-TRAINED MACHINE LEARNING MODEL WITH THE DEEP LEARNING PROGRAM WITH NEURAL NETWORK AS INPUT TO DETECT DETACHING SUBGRAPH — 604

RESPONSIVE TO DETECTING A DETACHING SUBGRAPH, OUTPUT A LOCATION OF THE DEEP LEARNING PROGRAM CAUSING THE DETACHING SUBGRAPH — 606

RUN THE NEURAL NETWORK IN TRAINING MODE — 608

MONITOR WEIGHT GRADIENTS ASSOCIATED WITH TRAINING OF THE NEURAL NETWORK — 610

BASED ON MONITORING, DETECT PRESENCE OF DETACHING SUBGRAPH IN THE NEURAL NETWORK — 612

RESPONSIVE TO DETECTING DETACHING SUBGRAPH, OUTPUT THE DETACHING SUBGRAPH — 614

(51) Int. Cl.
G06F 18/214 (2023.01)
G06N 3/088 (2023.01)

(56) References Cited

U.S. PATENT DOCUMENTS

| | | | |
|---|---|---|---|
| 10,635,409 | B2 | 4/2020 | Pradhan et al. |
| 2015/0135166 | A1 | 5/2015 | Tarlow et al. |
| 2017/0212829 | A1 | 7/2017 | Bales et al. |
| 2018/0150742 | A1 | 5/2018 | Woulfe et al. |
| 2019/0042529 | A1 | 2/2019 | Nurvitadhi et al. |
| 2019/0317879 | A1 | 10/2019 | McCormick |

OTHER PUBLICATIONS

Dai ("NeST: A Neural Network Synthesis Tool Based on a Grow-and-Prune Paradigm") IEEE Transactions on Computers, vol. 68, No. 10, Oct. 2019 1487 (Year: 2019).*

Yasunaga ("Graph-based, Self-Supervised Program Repair from Diagnostic Feedback") iarXiv: 2005.10636v2 [cs.SE] Jun. 30, 2020 (Year: 2020).*

Tokui ("Chainer: A Deep Learning Framework for Accelerating the Research Cycle") KDD â19, Aug. 4â8, 2019, Anchorage, AK, USA (Year: 2019).*

Braiek ("TFCheck: A TensorFlow Library for Detecting Training Issues in Neural Network Programs") 2019 IEEE 19th International Conference on Software Quality, Reliability and Security (QRS) (Year: 2019).*

Hussain ("Deep transfer learning for source code modeling") arXiv:1910.05493v2 [cs.LG] Jul. 14, 2020 (Year: 2020).*

Liang ("Seml: A Semantic LSTM Model for Software Defect Prediction") Digital Object Identifier 10.1109/Access.2019.2925313 (Year: 2019).*

Islam ("Repairing Deep Neural Networks: Fix Patterns and Challenges") 2020 IEEE/ACM 42nd International Conference on Software Engineering (ICSE) (Year: 2020).*

Zhang ("An Empirical Study on TensorFlow Program Bugs") ISSTA'18, Jul. 16-21, 2018, Amsterdam, Netherlands (Year: 2018).*

Li ("Locating Vulnerability in Binaries Using Deep Neural Networks") Digital Object Identifier 10.1109/Access.2019.2942043 Date of Publication: Sep. 18, 2019 (Year: 2019).*

NIST, "NIST Cloud Computing Program", http:/csrc.nist.gov/groups/SNS/cloud-computing/index.html, Created Dec. 1, 2016, Updated Oct. 6, 2017, 9 pages.

Kathuria, A., "PyTorch 101, Part 5: Understanding Hooks", https://blog.paperspace.com/pytorch-hooksgradient-clipping-debugging/, Jul. 7, 2019, 8 pages.

Ma, S., et al., "MODE: Automated Neural Network Model Debugging via State Differential Analysis and Input Selection", ESEC/FSE '18, Nov. 4-9, 2018, pp. 175-186.

Pei, K., et al., "DeepXplore: Automated Whitebox Testing of Deep Learning Systems", SOSP '17, Oct. 28, 2017, 18 pages.

Kang, D., et al., "Model Assertions for Debugging Machine Learning", https://cs.stanford.edu/~matei/papers/2018/mlsys_model_assertions.pdf, Accessed on Nov. 12, 2020, 9 pages.

Chakarov, A., et al., "Debugging Machine Learning Tasks", arXiv:1603.07292v1, Mar. 23, 2016, 29 pages.

Vaswani, A., et al., "Attention Is All You Need", 31st Conference on Neural Information Processing Systems (NIPS 2017), arXiv:1706.03762v5, Dec. 6, 2017, 15 pages.

Pytorch, "The difference in usage between nn.ModuleList and python list", https://discuss.pytorch.org/t/the-difference-in-usage-between-nn-modulelist-and-python-list/7744/2, Accessed on Nov. 12, 2020, 2 pages.

Sajadian et al., "The advantages of using a Lucky Imaging camera for observations of microlensing events", Mar. 2, 2016, 12 pages, https://arxiv.org/abs/1603.00729.

* cited by examiner

DETECTED DETACHED
SUBGRAPH IN NEURAL
NETWORK

106

PROCESSOR(S)

104

NEURAL NETWORK

102

DEEP LEARNING PROGRAM
WITH NEURAL NETWORK

202

MONITORS
ATTACHER/MO
NITORING

204

EXECUTOR/RUN
NEURAL
NETWORK

206

RANDOM DATA
GENERATION

208

REPORT
GENERATOR/G
ENERATION

210

212

DETACHED SUBGRAPH
DETECTED

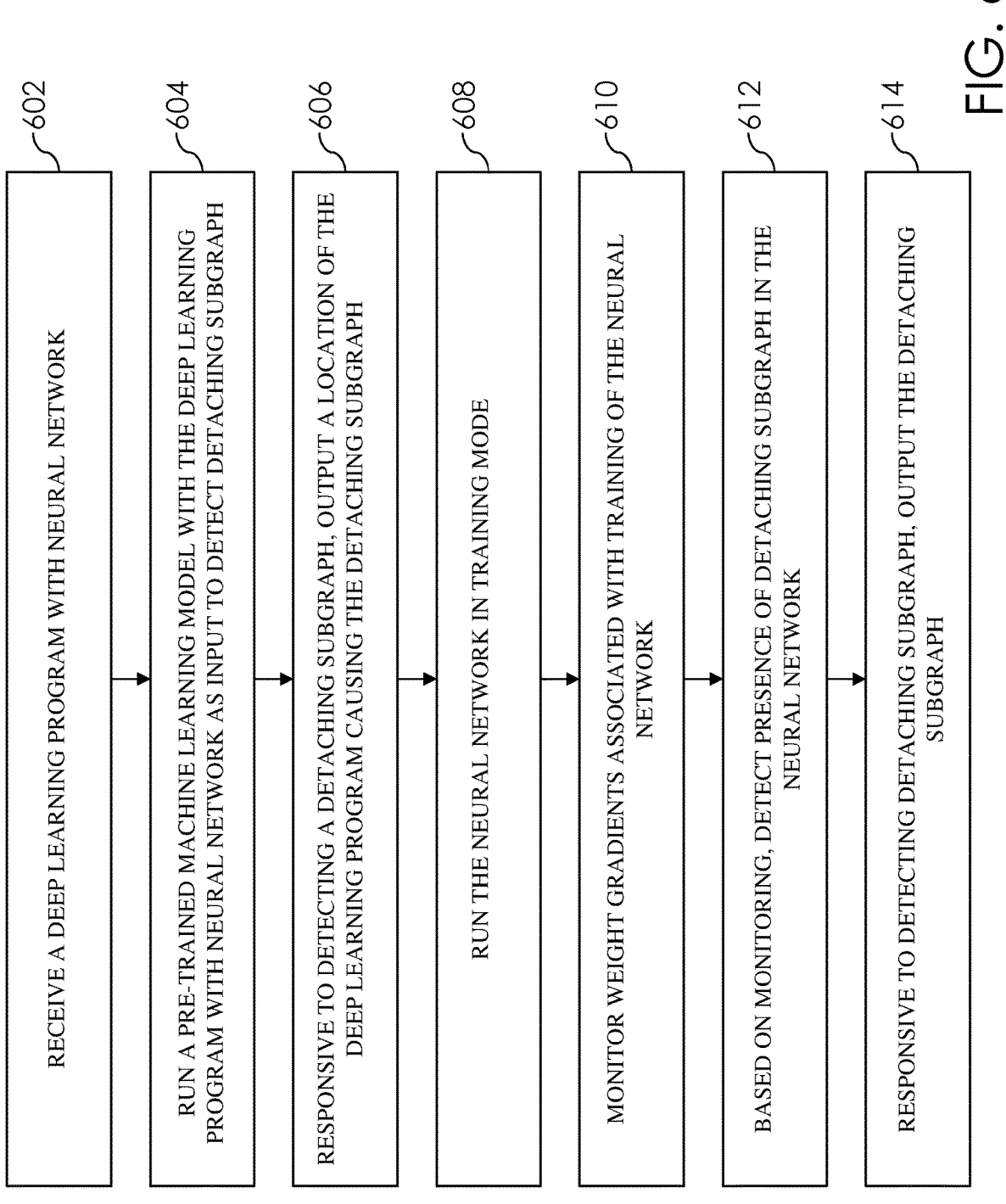

FIG. 6

602 — RECEIVE A DEEP LEARNING PROGRAM WITH NEURAL NETWORK

604 — RUN A PRE-TRAINED MACHINE LEARNING MODEL WITH THE DEEP LEARNING PROGRAM WITH NEURAL NETWORK AS INPUT TO DETECT DETACHING SUBGRAPH

606 — RESPONSIVE TO DETECTING A DETACHING SUBGRAPH, OUTPUT A LOCATION OF THE DEEP LEARNING PROGRAM CAUSING THE DETACHING SUBGRAPH

608 — RUN THE NEURAL NETWORK IN TRAINING MODE

610 — MONITOR WEIGHT GRADIENTS ASSOCIATED WITH TRAINING OF THE NEURAL NETWORK

612 — BASED ON MONITORING, DETECT PRESENCE OF DETACHING SUBGRAPH IN THE NEURAL NETWORK

614 — RESPONSIVE TO DETECTING DETACHING SUBGRAPH, OUTPUT THE DETACHING SUBGRAPH

AUTOMATIC AND UNSUPERVISED DETACHED SUBGRAPH DETECTION IN DEEP LEARNING PROGRAMS

BACKGROUND

The present application relates generally to computers and computer applications, and more particularly to detecting and/or correcting anomalies in machine learning programming such as detaching subgraphs or nodes in neural networks.

Deep learning programming such as neural network programming is based on construction of pre-defined layers to create a computing graph where one or more deep learning library functions can perform training, for example, forward and gradient calculation through back-propagation algorithms. In some instances, in a deep learning program, a code or function may accidentally detach a subgraph from the overall computing graph, for example, by applying an operation, which is not differentiable and/or assigning a value to a variable or tensor. Such unintentionally detached subgraphs can affect the deep learning models in their ability to learn effectively, and may result in inaccurately or under-performing trained models.

While such coding, which accidentally detach subgraphs in deep learning computing graphs, can occur frequently, it is not easy to identify which models such as neural networks are affected or which have been trained amidst the presence of detached subgraphs. For example, to detect such an occurrence, an engineer or programmer needs first realize or identify that a neural network is not learning correctly, or have not learned correctly, and then manually correct the program.

BRIEF SUMMARY

The summary of the disclosure is given to aid understanding of a computer system and a method of detecting and/or correcting errors in a computer system and/or computer instructions, for example, for deep learning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or its method of operation to achieve different effects.

A system and method for identifying and/or correcting an anomaly in deep learning program can be provided. In an aspect, a system can include a processor and a memory device coupled with the processor. The processor can be configured to receive a deep learning program with neural network. The processor can also be configured to detect whether the neural network includes a detaching subgraph. The processor can also be configured to, responsive to detecting that the neural network includes a detaching subgraph, output a report indicating that the neural network includes a detaching subgraph.

A computer-implemented method, in an aspect, can include receiving a deep learning program with neural network. The method can also include running a pre-trained machine learning model with the deep learning program with neural network as input, the pre-trained machine learning model detecting whether the neural network includes a detaching subgraph. The method can also include, responsive to detecting that the neural network includes a detaching subgraph, outputting a location of the deep learning program causing the detaching subgraph. The method can also include running the neural network in training mode. The method can also include monitoring weight gradients associated with training of the neural network. The method can also include, based on the monitoring, detecting whether the neural network includes a detaching subgraph. The method can also include, responsive to detecting that the neural network includes a detaching subgraph, outputting the weight gradients detected during the monitoring of the weight gradients.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 is a flow diagram illustrating a method of detecting an anomaly in deep learning programming in an embodiment.

DETAILED DESCRIPTION

Figure 1:
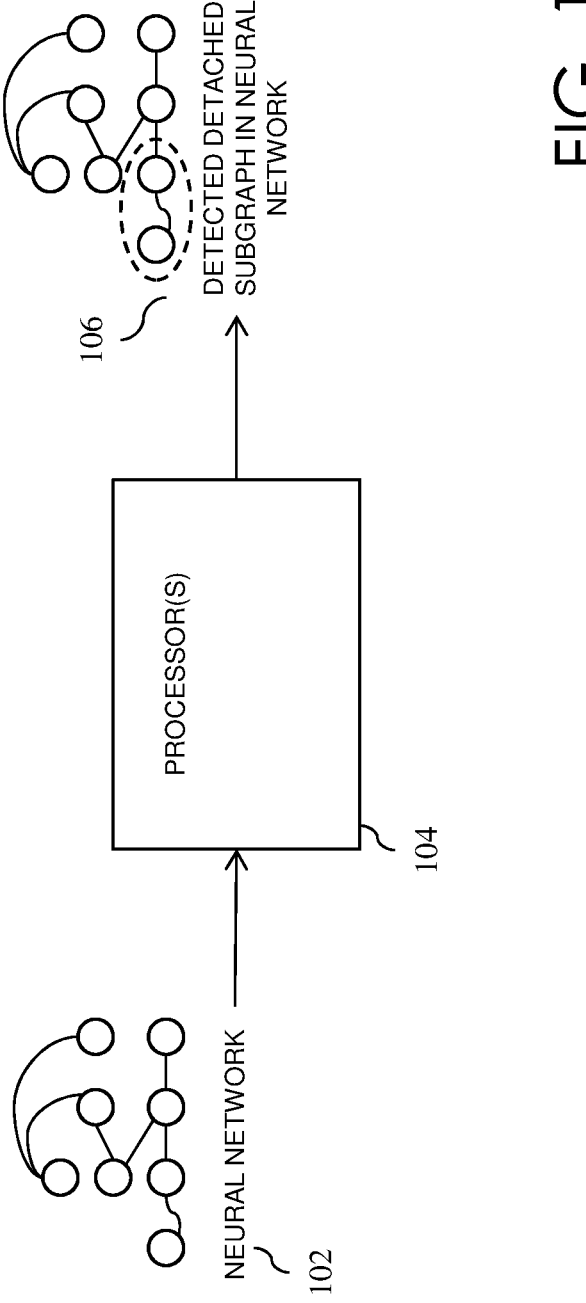
FIG. 1 is a block diagram illustrating a system in an embodiment that detects an anomaly in deep learning, for example, detecting subgraph detachment in a neural network.

Systems and methods for automatically detecting anomalies in machine learning programming can be provided. In an embodiment, a system and/or method automatically detects a subgraph detaching from a computing graph of a deep learning model such as a neural network model.

Briefly, an artificial neural network (ANN) or neural network (NN) is a machine learning model, which can be trained to predict or classify an input data. An artificial neural network can include a succession of layers of neurons or nodes, which are interconnected so that output signals of neurons in one layer are weighted and transmitted to neurons in the next layer. A neuron $N_i$ in a given layer may be connected to one or more neurons $N_j$ in the next layer, and different weights $w_{ij}$ can be associated with each neuron-neuron connection $N_i$-$N_j$ for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated, for example, using a back-propagation algorithm, as the network "learns" from the training data. For instance, as the learning continues through epochs of training using training data, the weights adjust. The resulting trained model, with weights defined via the training operation, can be applied to perform a task based on new data. Activation data refers to an output signal generated by a neuron or node of a neural network, for example, an output of an activation function of the neuron, which for example, indicates which internal neurons or nodes are activated.

A computing graph includes layers of nodes or neurons connected via edges of a deep learning model, e.g., a neural network. A subgraph includes one or more nodes of a computing graph of a deep learning model. The nodes in the subgraph can be connected by edges.

In one or more embodiment, the systems and methods can be implemented on one or more processors such as computer processors and hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a system automatically detects a program or code anomaly in a computer code, for example, at runtime (e.g., during program execution, also referred to as runtime detection) and/or through a static analysis of the code, for example, while the code is between composed or created (also referred to as on-the-fly detection).

FIG. 1 is a block diagram illustrating a system in an embodiment that detects an anomaly in deep learning, for example, detecting subgraph detachment in a neural network. One or more processors 104 such as hardware processors detect anomaly in computer code implementing a machine learning model such as a deep learning model, for example, a neural network. One or more processors 104 take or receive a neural network implementation in a form of computational graph 102, for example, a neural network implemented using machine learning library, software or like compiler language. One or more processors 104 may analyze or evaluate the received neural network implementation 10 to detect whether an anomaly such as detaching subgraph in the neural network implementation. At 106, one or more processors may output locations in the code, for example, source code implementing the neural network, where the subgraph is detached from the neural network. In an embodiment, one or more processors 104 may monitor the gradients of the weights of the neural networks constructed in the deep learning program to detect an anomaly such as detaching subgraphs. In an embodiment, one or more processors 104 may run a machine learning model to detect an anomaly such as detaching subgraphs.

The system may also generate an alert or notification, for example, so that a user such as a programmer or engineer is notified of the detected problem. In an embodiment, the system can further provide a suggestion for correcting the detected error or anomaly. In an embodiment, the system need not be aware of a particular framework. For example, the system can work with codes created in or with any deep learning framework and languages such as, but not limited to, PyTorch, TensorFlow and Theano.

In an embodiment, a machine learning model such as a neural network, e.g., long short term memory (LSTM) and/or recurrent neural network (RNN), but not limited to such, can be trained to detect code anomaly. Input to such a machine learning model can be a deep learning computer program, for example, a source program including computer code, e.g., input as a sequence of tokens, e.g., a sequence of words, text or the like. The machine learning model may output whether a subgraph detachment is detected in the input source program, and/or the location of the source program that contains a line of code causing subgraph detachment. In an embodiment, training of the machine learning model can be completely unsupervised. For example, unsupervised training data collection methodology can be implemented, which can eliminate a need for manual efforts (e.g., human in the loop) in labeling the training data.

In an embodiment, the system can include different methods for detecting detached subgraphs in deep learning programs. For example, the system can include run time detection, for example, after compiling and executing the source code (e.g., during or after running of the code), and/or on-the-fly detection, for example, performing static analysis over the source code. In an embodiment, the system can combine the two methods, or perform either one independently of one or another.

Figure 2:
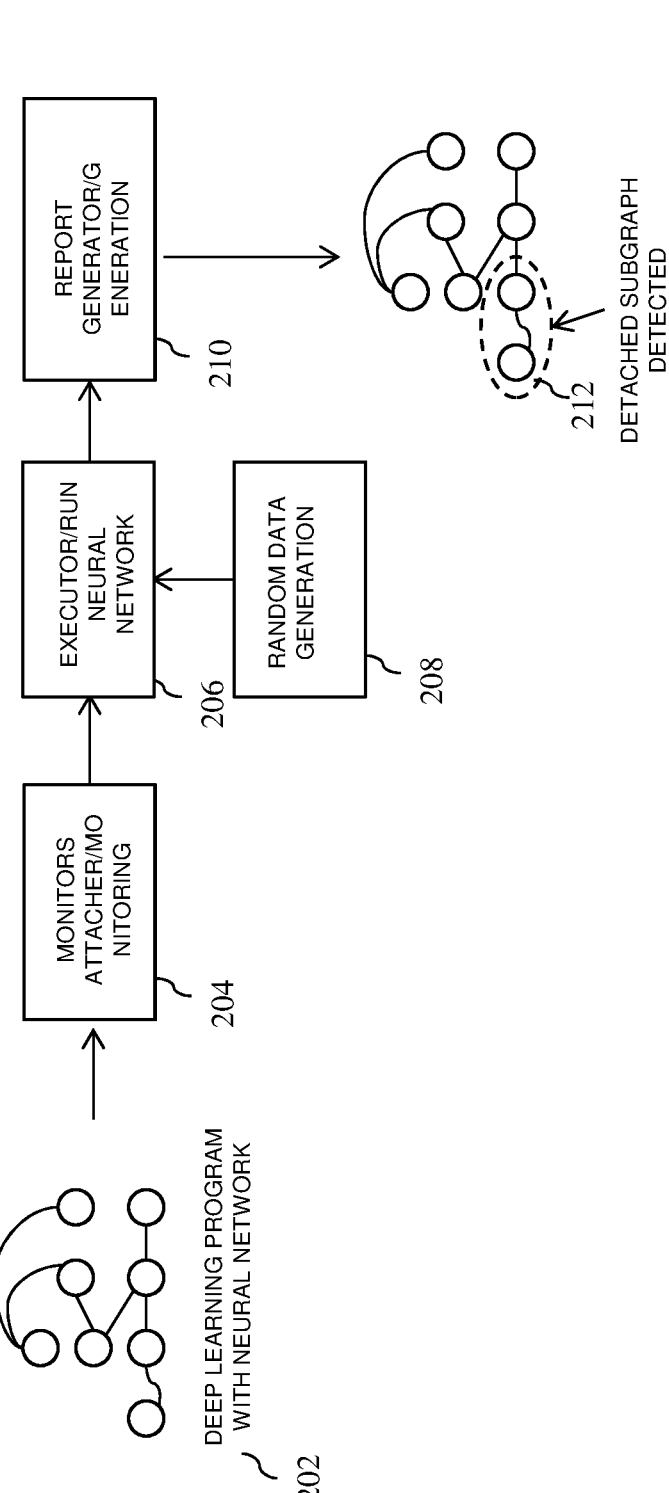
FIG. 2 is a diagram illustrating components of a runtime detector performing runtime detection in an embodiment.

FIG. 2 is a diagram illustrating components of a system or runtime detector performing runtime detection in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

The system may randomly feed a neural network or deep learning model with training data and monitor all the weights that have any connection in the model. The system may identify all anomalies such as weights that do not update, and output a report which identifies the anomaly, for example, related to subgraph detachment. The report may also include a suggestion of correcting the anomaly related to subgraph detachment.

Referring to FIG. 2, the runtime detector receives a deep learning program implementing a neural network 202. The program can be a compiled or executable code and/or a source code. If source code, the runtime detector may compile the code into a form that can be run, e.g., on a processor or machine. This neural network is one that the program is implementing and for which whether it is being trained accurately, is to be detected. Random data generation 208 generates data input to the received neural network, for example, to run the neural network for inferencing. For example, data can be generated randomly as input data to the received neural network. An executor 206 runs the neural network 202, and a monitors attacher 204 monitors the running of the neural network 202. For example, the monitors attacher 204 monitors or analyzes the evolution or updating of components or parameters of the neural network 202 as the neural network 202 learns (trained) over a plurality of epochs. A report generator 210 reports any detected detached subgraph. In an embodiment, the runtime detector can generate an alert and provide any detected detached subgraphs 412. For example, the report generator 210 can report anomaly in the neural network weights' gradient series and can provide any detached subgraph 212 as output for recommending correction.

In an embodiment, the monitors attacher 204 monitors weight values of the neural network and also the gradients of the weights over time as the neural network is trained with multiple mini-batches. For example, change in weights or gradients associated with each edge connecting nodes in the neural network is monitored. If the gradient or weight series meets a predefined condition or threshold (e.g., weights do not change values over a number of mini-batches of training, or gradient is zero over a number of back-propagation iterations, or another statistical threshold), it is determined that the nodes connected that edge have become detached. For example, if a weight does not change over a predefined period of time, e.g., predefined number of training epochs, the monitors attacher 204 determines that a detaching of subgraph is occurring. In an embodiment, nodes that are affected, e.g., nodes connected by edges whose weights are determined to be unchanging over time, can be provided as output.

Figure 3:
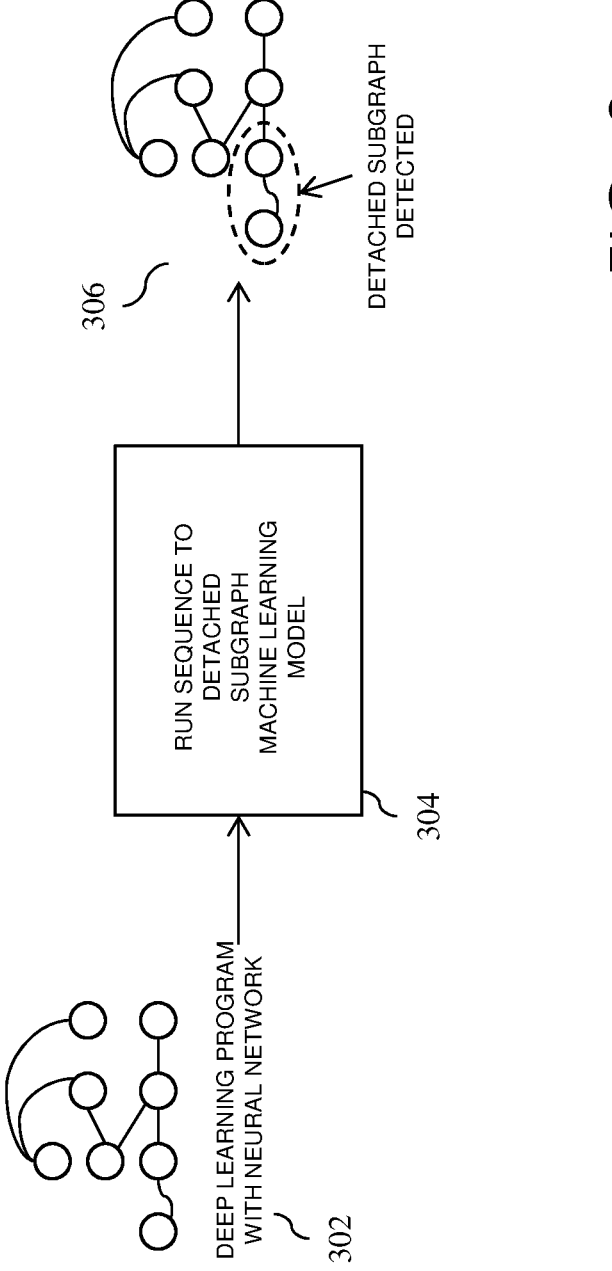
FIG. 3 is a diagram illustrating on-the-fly detection of anomaly in deep learning in an embodiment.

FIG. 3 is a diagram illustrating on-the-fly detection of anomaly in deep learning in an embodiment. For example, an on-the-fly detector detects detached subgraphs in a neural network. In an embodiment, the on-the-fly detector can include a machine learning model 304, which is pre-trained on unlabeled data. In an embodiment, the input to the machine learning model can include source code of a deep learning program 302, e.g., a PyTorch program, and the output of the machine learning model is the prediction of areas in the code that contain the error 306. In an embodiment, training data for training the machine learning model can be collected from public repositories or programs, which may include sharable programs, and which may include code containing errors or anomalies causing subgraph detaching in deep learning computing graphs or neural networks. Any other sources can provide training data. In an embodiment, the runtime detector, for example, described with reference to FIG. 2, can be run or used to generate labeled training data among the programs received from such sources. For example, the runtime detector receives such source code and outputs detection and/or locations of the source code containing anomalies. Fragments of the source code containing the anomalies can be labeled and used to train the machine learning model. Once the machine learning model is trained or pre-trained, it (e.g., shown at 304) can be used to detect detaching subgraph through a static analysis of the source code, for example, on-the-fly. For example, fragments of deep learning programs as being constructed can be input to the trained machine learning model for the machine learning model to detect code or lines of code that can produce detached subgraphs. For example, a code as being constructed can be fed into the on-the-fly detector's trained machine learning model line by line or section by section and the machine learning model can detect whether that line of code or section of the code has anomaly that could cause a detaching subgraph. In this way, exact location of the code (e.g., by line or section) where the error is occurring can be identified. For example, the machine learning model can be trained to predict whether a program has a detached subgraph, which can include implementing the machine learning model to solve a classification problem, for example, output a classification. The machine learning model can also be trained to output positions where the detachment happens, which can include implementing the machine learning model to solving a regression problem. The latter training can be achieved by training a sequence to position model (e.g., input is a deep learning program and output is a location (line number) of the suspected anomaly).

An example of the machine learning model can be a neural network, for example, but not limited to, long short term memory (LSTM) and/or recurrent neural network (RNN). Input to such a machine learning model can be a sequence of tokens corresponding to text or code statements in deep learning computer program. The machine learning model may output whether a subgraph detachment is detected in the input sequence, and/or the location in the sequence of code statements containing code causing subgraph detachment.

Figure 4:
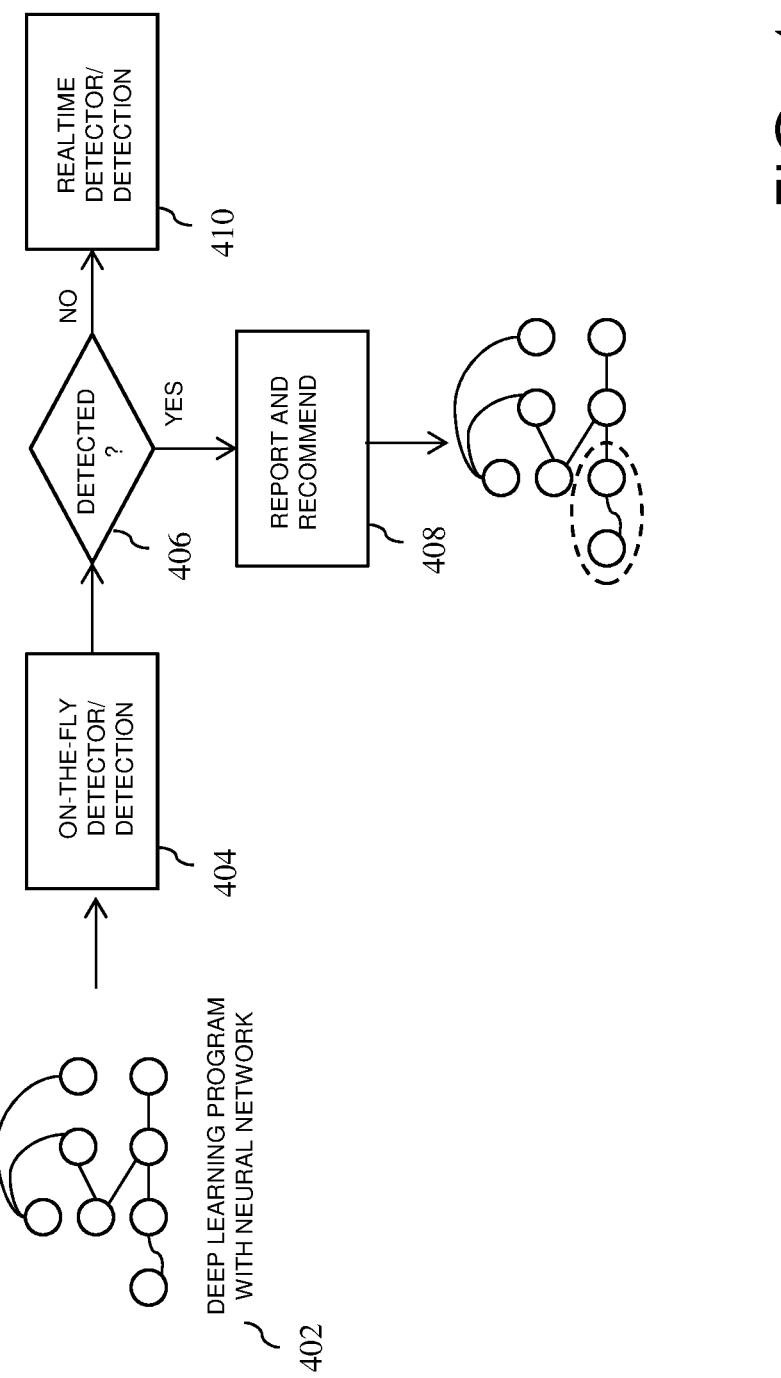
FIG. 4 is a diagram illustrating a method in an embodiment of detecting an anomaly in deep learning programming in an embodiment.

FIG. 4 is a diagram illustrating a method in an embodiment of detecting an anomaly in deep learning programming in an embodiment. The method can be implemented by and/or run on one or more computer processors such as hardware processors. At 402, a deep learning program, for example, implementing a neural network is received or obtained. For example, an on-the fly detector 404 can receive the program 402. The program 402 can be a source code, and can be a fragment of code, such as a fragment of a program that a programmer or the like is creating or has created. For instance, the source code can be code that is being created in an integrated programming environment or framework and as pieces or fragments of code are generated or developed, a fragment can be fed into the detector 404. For example, while the deep learning programming is being constructed, a trained machine learning model is run by the on-the-fly detector 404 (e.g., described with reference to FIG. 3) to detect a detached subgraph, if any, in the code.

At 406, responsive to the on-the-fly detector 404 detecting a detached subgraph, the on-the-fly detector 404 generates an alert or report at 408 to notify a user, for example, the developer. In an embodiment, the on-the-fly detector 404 also generates a recommendation for correcting the error, for example, modifying the code so that subgraph detaching is corrected. The on-the-fly detector 404, for example, may also learn (e.g., via neural network based learning) recommendations to suggest and/or may use a rule based methodology to determine what recommendation to suggest for the detected anomaly. The generated alert or report at 408 can contain an alert that a detached subgraph is detected and/or the location of the detected anomaly in the code, e.g., a line in the code that causes subgraph detaching. The generated report can also include a suggested correction. In an embodiment, to provide these suggestions, the detector 404 uses information stored during an automatic construction or collection of dataset. The dataset construction or collection process obtains or receives source codes from public repositories or other available repositories. A processor may check whether such source codes contain error or anomaly. The processor may also (e.g., using a code versioning mechanism) evaluate whether subsequent versions of the code have solved the anomaly, noting and storing the changes to the source code that corrected the error in the earlier version. The database containing all the changes that correct the anomaly can be used by the detector 404 to suggest the modifications, e.g., using one or more distance-based approaches or neural approaches.

In an embodiment, fragments of code as the program is constructed can be fed into to the on-the-fly detector 404 to detect a possible anomaly in the code, and suggest a recommendation to correct the anomaly in the code.

A processor may automatically compile the constructed program and run the constructed program with data, for example, once the creation or development of the program is finished. The processor, for example, can randomly generate the data to use in running the program. A runtime detector at 410, for example, described with reference to FIG. 1, monitors the program behavior to detect at runtime detached subgraphs, if any. At 408, any detected detached subgraph is reported. For example, the processor can generate an alert and provide any detected detached subgraphs 412. In an embodiment, the processor can report anomaly in the neural network weights gradient series and provide any detached subgraphs as output for recommending correction.

Figure 5:
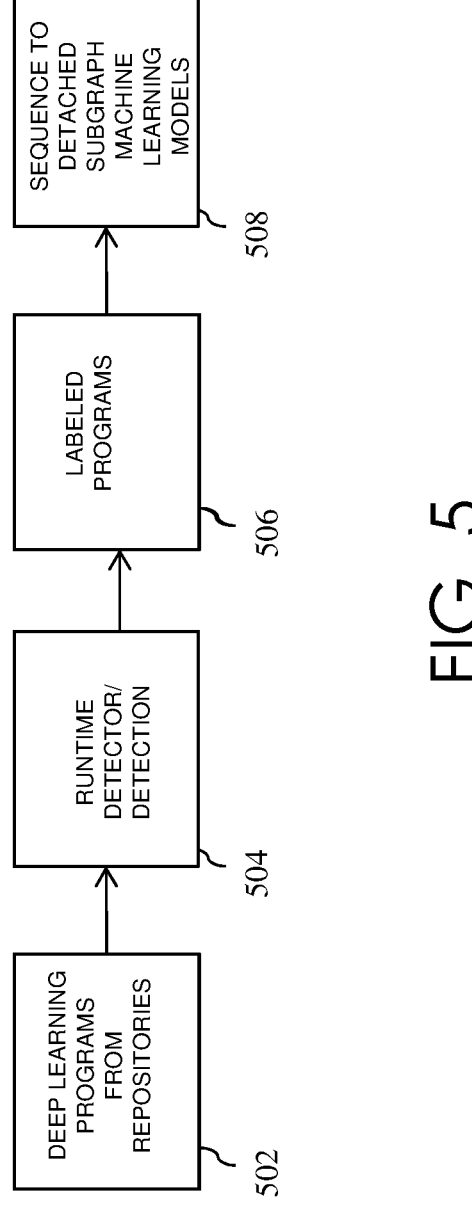
FIG. 5 is a diagram illustrating components for machine learning model training and labeled data collection in an embodiment.

FIG. 5 is a diagram illustrating components for machine learning model training and labeled data collection in an embodiment. At 502, one or more processors may collect deep learning programs with neural network implementation from one or more sources. Examples of sources can include available or accessible repositories such as source code repositories, for example, shared by multiple developers, which store various code developed by programmers or the like. Deep learning programs can be collected from other sources. The deep learning programs implement training of machine learning or neural network models, which include computing graphs in training. In an aspect, it may be expected that some of the code stored in repositories may contain snippets of code, which can cause an anomaly to occur such as detaching subgraphs in computing graphs of deep learning.

The obtained or received programs are input to a runtime detector. At 504, the runtime detector runs the programs and analyzes the neural networks' parameters and changes or updates occurring in the parameters during the training of the neural networks through epochs of training. For instance, the runtime detector runs a deep learning program and monitors a training occurring in a neural network model being trained over one or more epochs. For example, the runtime detector monitors parameter values such as weights of the neural network through training iterations and identifies gradients or changes in the weights. In an embodiment, if one or more gradients do not change or the changes do not meet of a predefined threshold, the runtime detector infers that the nodes of the graph or neural network associated with those gradients are being detached.

At 506, the runtime detector labels the program to create labeled programs. For example, if the program during its run at 504 is detected as containing code that causes a detaching subgraph, a processor may label the program as such, e.g., positive. Otherwise, the program can be labeled as negative. In an embodiment, the processor creates training data for a specific type of anomaly, for example, for solving that anomaly.

At 508, the processor uses the labeled programs as training data to train a machine learning model. The machine learning model is also referred to herein as a SequenceTo-DetachedSubgraph machine learning model, for explanation purposes. A detector, e.g., on-the-fly detector described with reference to FIG. 3, uses the trained model to perform on-the-fly detection, for example, to detect code snippet or code fragment which causes detaching subgraph during neural network training. For instance, to create a labeled program, a processor runs a realtime detector at runtime and monitors the weights and/or gradients of the edges in the computing graph of the deep learning program such as the neural network. If an edge is detected as disconnected from the entire computing graph, the processor can link the given connection (which is detected as being detached) to a variable (related to a declared layer of the network). In this way, for example, the processor can identify one or more lines in the program where one or more errors may be occurring.

This machine learning models takes input as a computer program considered as a sequence of tokens. For example, the content such as text or lines of the programs and corresponding labels can be processed into tokens and into a format such as a feature vector to train the SequenceTo-DetachedSubgraph machine learning model. The trained model can predict one or more occurrences of detached subgraphs in a given program, for example, previously unseen program. In an aspect, creating of the SequenceTo-DetachedSubgraph machine learning model can be considered completely unsupervised in the aspect that it does not require manually or previously labeled training data, for example, does not require human in the loop to create labeled data, as the method creates labeled data automatically from unlabeled ones received at 502.

In an aspect, a system and method need not be aware of a particular framework, can be automatic and unsupervised in performing detached subgraph detection in deep learning programs. For instance, the system can take deep learning computer programs implemented in any frameworks and outputs one or more locations in the source code where the subgraph is detached from the neural network. A runtime detector can detect detached subgraphs at runtime when the program is compiled and executed, for example, by monitoring anomalies in the gradients of the network weights. An on-the-fly detector can include a machine learning model trained to detect one or more detached subgraphs on-the-fly, e.g., during the construction of the deep learning program (e.g., as it is being created) and/or after the program is constructed. The machine learning model can be trained using unsupervised method for data labeling. For example, deep learning programs are collected from sources such as publicly available repositories storing source codes that implement deep learning or neural networks. These programs are used as input to a runtime detector to generate labeled programs. The labels indicate whether there is code in the program that causes detached subgraph.

The system and/or method, in an aspect, debugs and/or corrects deep learning programs, for example, automatically and in unsupervised manner, reducing time for creating such programs. The system and/or method may work for all deep learning framework. In an embodiment, the system and/or method take as input deep learning computer programs and outputs detection of subgraph detachment. In an embodiment, a specific type of anomaly or bug for deep learning programs is detected by monitoring the gradients of the weights of the neural networks, for example, without having to know the locations of the errors or other information such as versions of the source code. In an aspect, the type of anomaly that is detected such as the subgraph detaching in deep learning program does not interrupt the program to run but influences the prediction accuracy of the deep learning program. For example, both static analysis using a trained machine model and runtime detection can be employed to detect such anomaly. In another aspect, the system and/or method can provide one or more suggests to fixing the anomaly.

FIG. 6 is a flow diagram illustrating a method of detecting an anomaly in deep learning programming in an embodiment. The method can be performed by or run on one or more hardware processors. At 602, a deep learning program with neural network can be received. For example, the program includes code or instructions that implement a neural network. In an embodiment, the framework of the deep learning program need not be known. For example, the method works with deep learning programs developed in any framework or language.

At 604, a pre-trained machine learning model can be run with the deep learning program with neural network as input. The pre-trained machine learning model detects whether the neural network includes a detaching subgraph, e.g., whether there is an occurrence or presence of detaching deep learning program. In an embodiment, the method can also include providing a suggestion to correct the deep leaning program.

The following code fragment shows an example of code, which is modified to correct detaching subgraphs in a deep learning program. The PyTorch partial implementation of a network. e.g., line 4, may create detached subgraphs.

```
1    class Extractor (nn.Module):
2        def ___init___(self, sub__modules: List[nn.Module]):
3            . . .
4            self.sub__modules = [s.to(self.device) for s in sub__modules]
5        . . .
6        def forward(self, sentences):
7            return ___combine__sub__modules__results(sentences)
```

While the compiler or runtime of the above code may not report any error, the weights of the submodule will not be updated when backpropagating the error or loss through the parent network.

The correct implementation should use the nn.ModuleList wapper as follows.

```
1    class Extractor (nn.Module):
2        def ___init___(self, sub__modules: List[nn.Module]):
3            . . .
4            self.sub__modules = nn.ModuleList(sub__modules).to(self.device)
5        . . .
6        def forward(self, sentences):
7            return ___combine__sub__modules__results(sentences)
``` subgraph or detached subgraph in the neural network. The method in an aspect can also include pre-training the pre-trained machine learning model in unsupervised manner. For example, unlabeled training data including a plurality of deep learning programs are labeled automatically based on monitoring weight gradients associated with computing graphs of the plurality of deep learning programs and used to pre-train the pre-trained machine learning model.

At 606, responsive to detecting a detaching subgraph in the neural network, a location of the deep learning program causing the detaching subgraph can be output. The processing at 602 and 604, for example, can be performed on-the-fly as the deep learning program is constructed.

At 608, the neural network can also be run in training mode. For example, random data can be generated and input to the neural network to train the neural network.

At 610, weight gradients associated with training of the neural network can be monitored. For instance, weight values of the neural network as it is trained are monitored.

At 612, based on monitoring, it is detected whether the neural network includes a detaching subgraph. For example, it is detected whether there is a detaching or detached subgraph in the neural network. For instance, if a weight associated with an edge connecting nodes does not change for a predetermined period of time during training epochs, it can be inferred that there is a detaching subgraph.

At 614, responsive to detecting that the neural network includes a detaching subgraph, for example, a detached or detaching subgraph is detected in the neural network, that detaching subgraph is output. The processing at 608, 610 and 612, can be performed at runtime of the deep learning program, for example, runtime of the neural network of the For instance, in the above examples, if "ModuleList" is used instead of a "list", "parameters( )" function will return all weights of that module. Otherwise, the parameters( ) function will not return the weights of the individual module in the list. Thus, when back-propagation is run, those weights will not be updated. These types of errors can be very difficult to detect.

Figure 7:
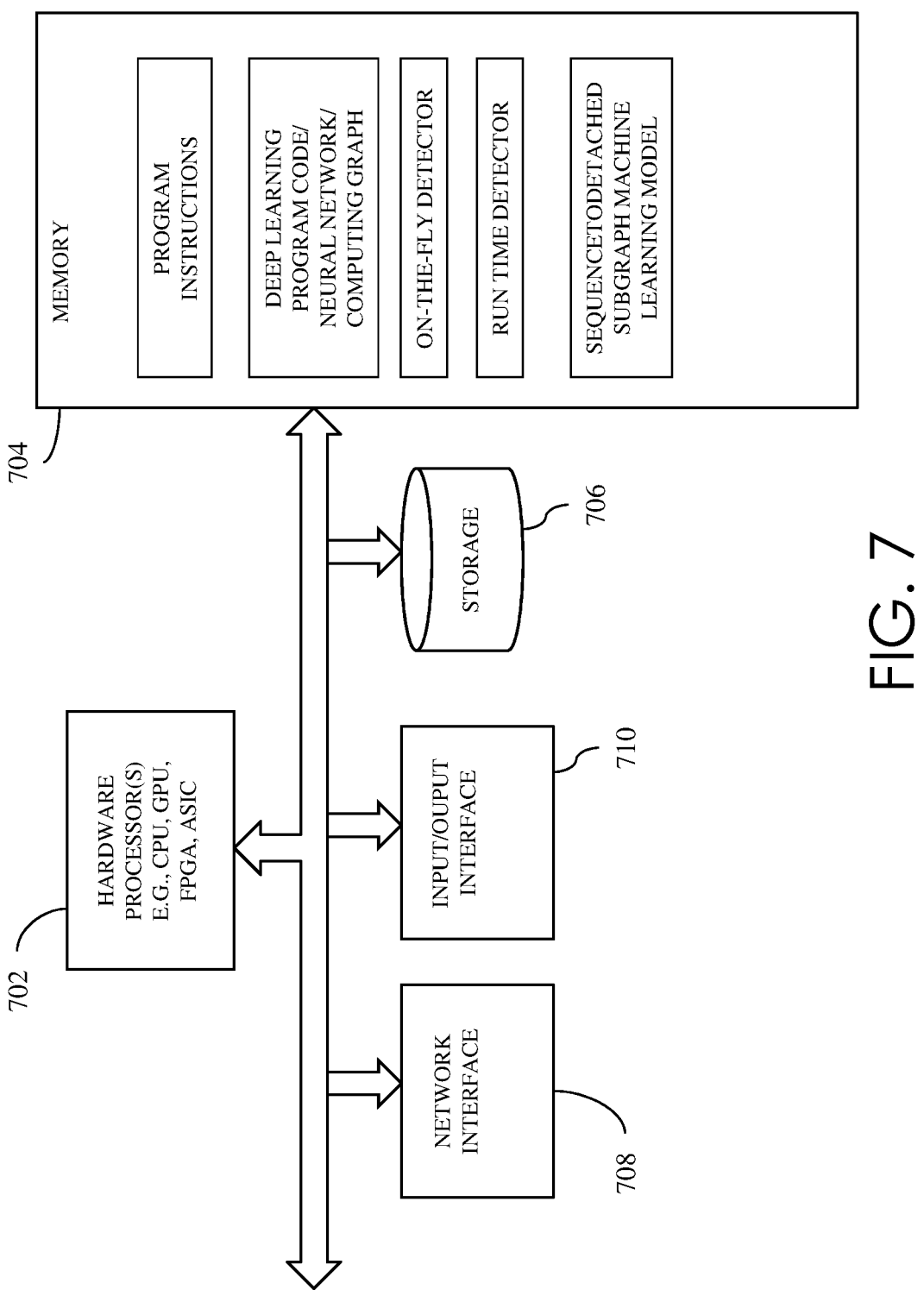
FIG. 7 is a diagram showing components of a system in one embodiment that detects anomaly in deep learning programs and/or neural networks.

FIG. 7 is a diagram showing components of a system in one embodiment that detects anomaly in deep learning programs and/or neural networks. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and perform anomaly detection, for example, using one or combinations of on-the-fly and run-time detection methodology. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input comprising one or more deep learning programs implementing neural networks. For instance, at least one hardware processor 702 may detect a detached subgraph in a neural network of a deep learning program. At least one hardware processor 702 may also generate a machine learning model (e.g., SequenceToDetachedSub-graph machine learning model) using training data in an unsupervised manner, for example, as described above. In one aspect, deep learning programs for use as training data may be stored in a storage device 706 or received via a network interface 708 from a remote device, and may be temporarily loaded into a memory device 704 for building or generating the machine learning model. The trained machine learning model may be stored on a memory device 704, for example, for running by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
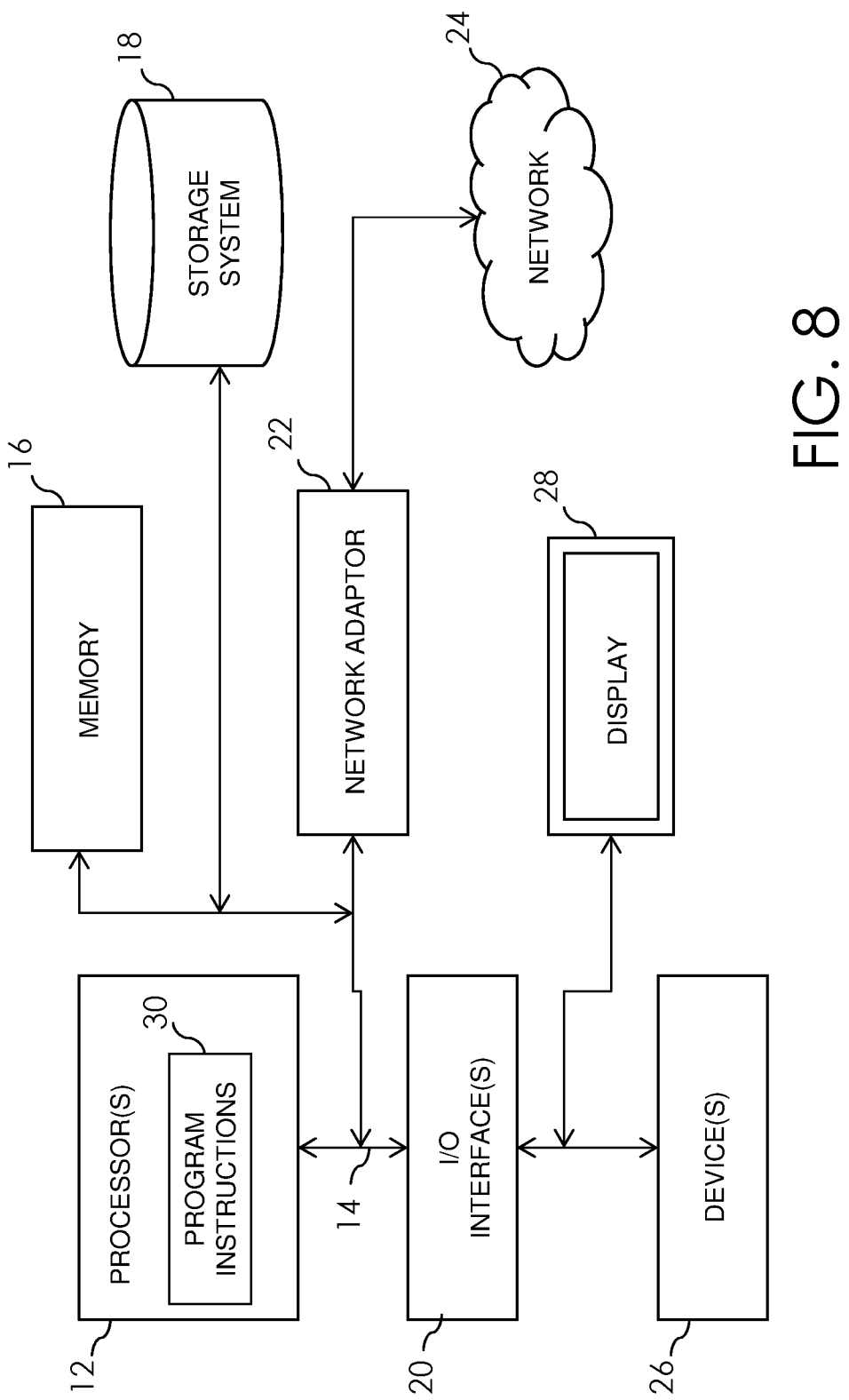
FIG. 8 illustrates a schematic of an example computer or processing system that may implement a system according to one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
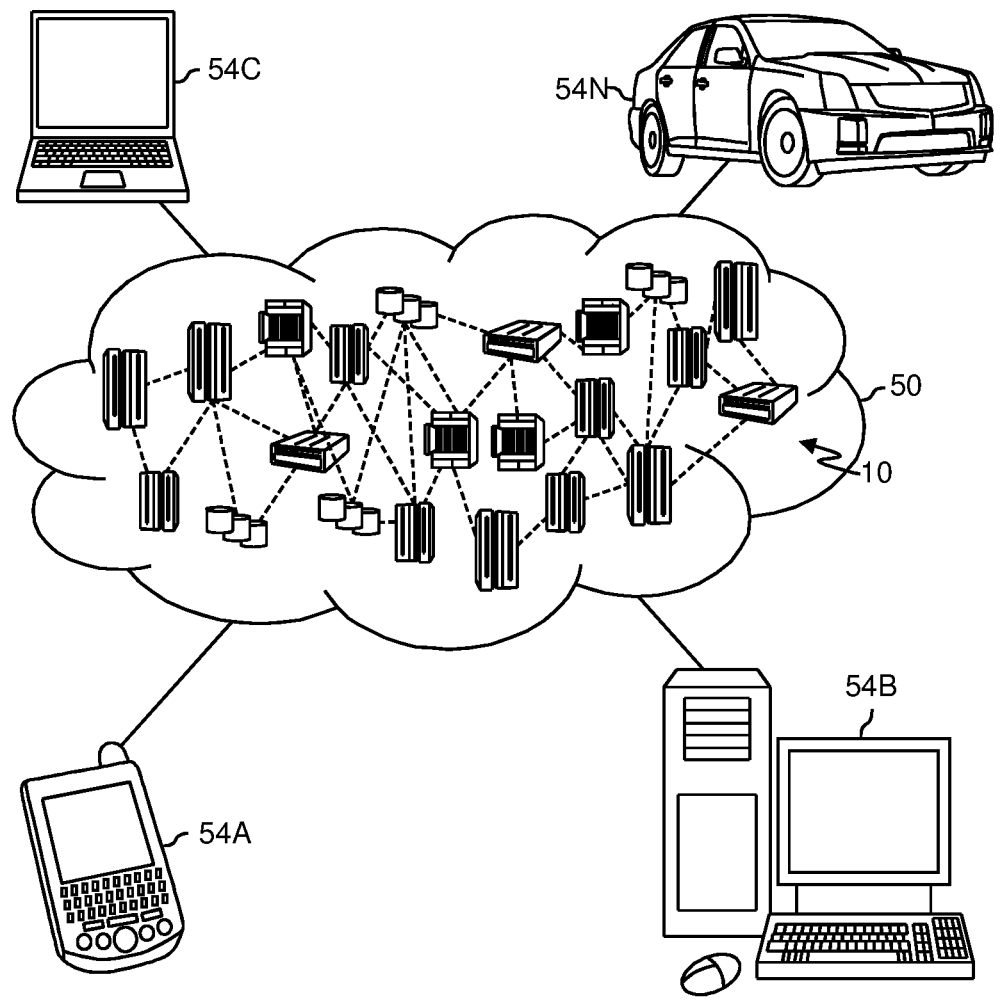
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
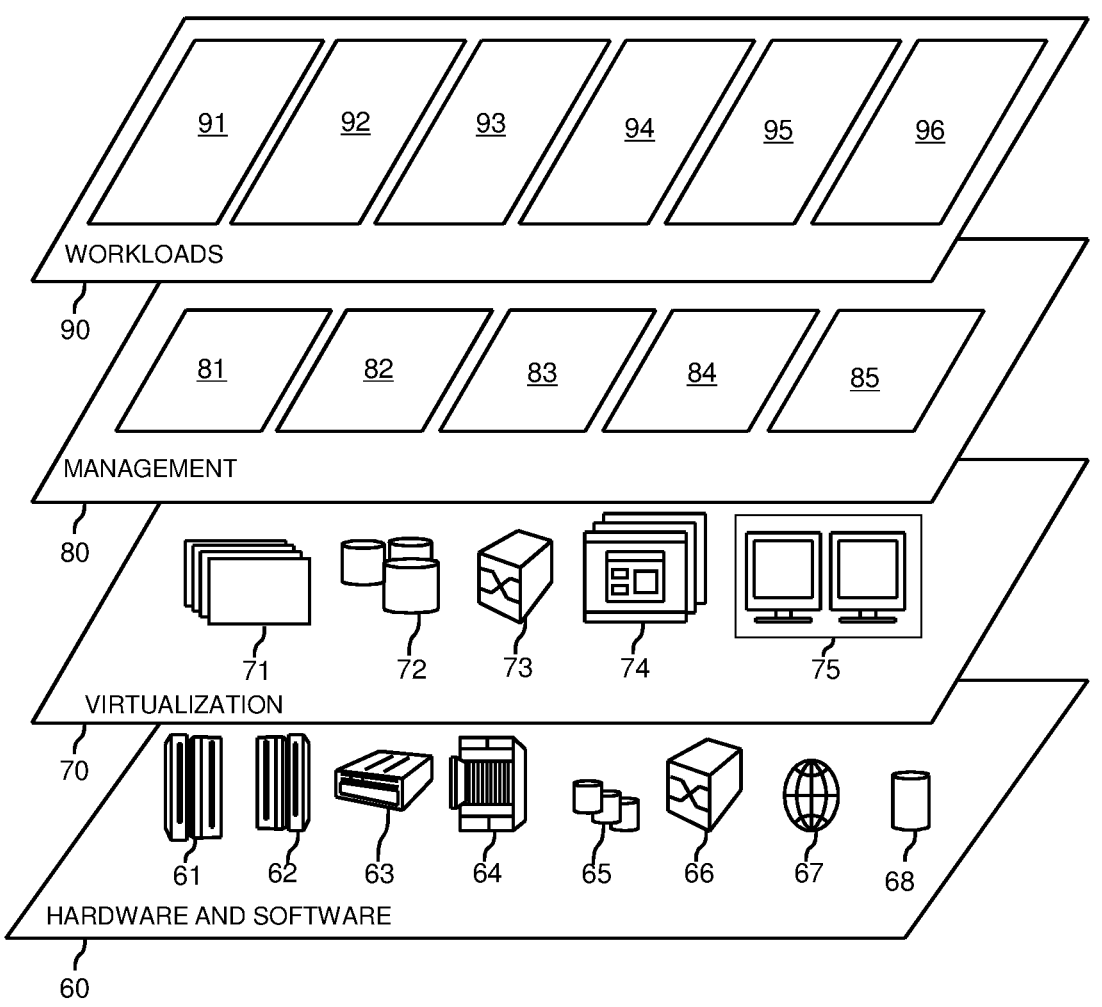
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural network anomaly detection processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

a processor; and a memory device coupled with the processor;

the processor configured to:

receive a deep learning program with a neural network;

detect whether the deep learning program creates at runtime a detaching subgraph in the neural network; and responsive to detecting that the deep learning program creates a detaching subgraph in the neural network, debugging automatically the deep learning program by at least outputting a report indicating that an anomaly in the deep learning program is detected in that the neural network includes a detaching subgraph, and correcting automatically the deep learning program by modifying a line of code in the deep learning program that creates the detaching subgraph, the processor further being configured to detect whether the neural network includes a detaching subgraph by inputting the deep learning program with neural network to a pre-trained machine learning model and running the pre-trained machine learning model, the pre-trained machine learning model outputting an indication whether the neural network includes a detaching subgraph, the pre-trained machine learning model identifying a location of the line of code in the deep learning program that creates the detaching subgraph, wherein fragments of source codes of deep learning programs as being constructed via an integrated programming environment are input to the pre-trained machine learning model for the pre-trained machine learning model to detect and output the location of the line of code in the source codes of deep learning programs that creates the detaching subgraph.

2. The system of claim 1, wherein the system is unaware of a framework associated with the deep learning program.

3. The system of claim 1, wherein the pre-trained machine learning model is trained in unsupervised manner, wherein unlabeled training data including a plurality of deep learning programs are labeled automatically based on monitoring weight gradients associated with computing graphs of the deep learning programs and used to pre-train the pre-trained machine learning model.

4. The system of claim 1, wherein the processor is configured to detect whether the neural network includes a detaching subgraph by running the neural network in training mode and monitoring weight gradients associated with training of the neural network, wherein the processor determines that the neural network includes a detaching subgraph responsive to determining that changes in the weight gradients are below a predefined threshold through training iterations.

5. The system of claim 4, wherein the processor is further configured to generate random data and train the neural network using the random data.

6. A computer-implemented method comprising:

receiving a deep learning program with a neural network;

running a pre-trained machine learning model with the deep learning program with the neural network as input, the pre-trained machine learning model detecting whether the deep learning program creates at runtime a detaching subgraph in the neural network;

responsive to detecting that the deep learning program creates a detaching subgraph in the neural network, debugging automatically the deep learning program by at least outputting a location of the deep learning program causing the detaching subgraph;

running the neural network in training mode;

monitoring weight gradients associated with training of the neural network;

based on the monitoring, detecting whether the neural network includes a detaching subgraph, wherein the neural network is determined as including a detaching subgraph responsive to determining that changes in the weight gradients are below a predefined threshold through training iterations;

responsive to detecting that the neural network includes a detaching subgraph, outputting the detaching subgraph detected during the monitoring of the weight gradients, and correcting automatically the deep learning program by modifying a line of code in the deep learning program that creates the detaching subgraph; and pre-training the pre-trained machine learning model in unsupervised manner, wherein unlabeled training data including a plurality of deep learning programs are labeled automatically based on monitoring weight gradients associated with computing graphs of the plurality of deep learning programs and used to pre-train the pre-trained machine learning model, the pre-trained machine learning model identifying a location of the line of code in the deep learning program that creates the detaching subgraph, wherein fragments of source codes of deep learning programs as being constructed via an integrated programming environment are is-input to the pre-trained machine learning model for the pre-trained machine learning model to detect and output the location of the line of code in the source codes of deep learning programs that creates the detaching subgraph.

7. The method of claim 6, further including providing a suggestion to correct the deep leaning program.

8. The method of claim 6, wherein random data is created and input to the neural network for training the neural network.

9. The method of claim 6, wherein the method is unaware of a framework associated with the deep learning program.

10. A computer program product comprising a computer readable storage medium having program instructions embodied therewith, the program instructions readable by a device to cause the device to:

receive a deep learning program with a neural network;

detect whether the deep learning program creates at runtime a detaching subgraph in the neural network; and responsive to detecting that the deep learning program creates a detaching subgraph in the neural network, debugging automatically the deep learning program by at least outputting a report indicating that an anomaly in the deep learning program is detected in that the neural network includes a detaching subgraph, and correcting automatically the deep learning program by modifying a line of code in the deep learning program that creates the detaching subgraph, wherein the device is caused to detect whether the neural network includes a detaching subgraph by inputting the deep learning program with neural network to a pre-trained machine learning model and running the pre-trained machine learning model, the pre-trained machine learning model outputting an indication whether the neural network includes a detaching subgraph, the pre-trained machine learning model identifying a location of the line of code in the deep learning program that creates the detaching subgraph, wherein fragments of source codes of deep learning programs as being constructed via an integrated programming environment are input to the pre-trained machine learning model for the pre-trained machine learning model to detect and output the location of the line of code in the source codes of deep learning programs that creates the detaching subgraph.

11. The computer program product of claim 10, wherein the pre-trained machine learning model is trained in unsupervised manner, wherein unlabeled training data including a plurality of deep learning programs are labeled automatically based on monitoring weight gradients associated with computing graphs of the deep learning programs and used to pre-train the pre-trained machine learning model.

12. The computer program product of claim 10, wherein the device is further caused to detect whether the neural network includes a detaching subgraph by running the neural network in training mode and monitoring weight gradients associated with training of the neural network, wherein the processor determines that the neural network includes a detaching subgraph responsive to determining that changes in the weight gradients are below a predefined threshold through training iterations.

13. The computer program product of claim 12, wherein the device is further caused to generate random data and train the neural network using the random data.

14. The computer program product of claim 10, wherein the pre-trained machine learning model includes a long-short term memory neural network model.

15. The computer program product of claim 10, wherein the pre-trained machine learning model includes a recurrent neural network model.

* * * * *